United States Patent [19]

Cripps

[11] Patent Number: 5,752,251
[45] Date of Patent: May 12, 1998

[54] METHOD AND APPARATUS FOR RECOVERING ABORTED FILE (OR DATA) TRANSMISSION

[75] Inventor: Michael J. Cripps, Lincroft, N.J.

[73] Assignee: NCR Corporation, Dayton, Ohio

[21] Appl. No.: 912,457

[22] Filed: Aug. 18, 1997

Related U.S. Application Data

[63] Continuation of Ser. No. 512,042, Aug. 7, 1995, abandoned.

[51] Int. Cl.$^6$ ........................................ G06F 17/30
[52] U.S. Cl. ........................ 707/202; 707/100; 707/104
[58] Field of Search ........................ 371/53, 32; 380/49; 395/500; 707/100, 104, 202

[56] References Cited

U.S. PATENT DOCUMENTS

| | | | |
|---|---|---|---|
| 4,639,864 | 1/1987 | Katzman et al. | 395/650 |
| 4,858,112 | 8/1989 | Puerzer et al. | 364/200 |
| 4,885,749 | 12/1989 | Golden | 371/32 |
| 5,263,156 | 11/1993 | Bowen et al. | 707/202 |
| 5,297,208 | 3/1994 | Schlafly et al. | 380/49 |
| 5,343,477 | 8/1994 | Yamada | 371/8.2 |
| 5,423,037 | 6/1995 | Hvasshovd | 707/202 |
| 5,446,888 | 8/1995 | Pyne | 395/600 |
| 5,446,904 | 8/1995 | Belt et al. | 395/750 |
| 5,479,654 | 12/1995 | Squibb | 395/600 |
| 5,528,383 | 6/1996 | Tezuka et al. | 358/435 |
| 5,535,229 | 7/1996 | Hain, Jr. et al. | 371/53 |
| 5,555,391 | 9/1996 | De Subijana et al. | 395/440 |
| 5,586,322 | 12/1996 | Beck et al. | 395/616 |
| 5,613,002 | 3/1997 | Kephart et al. | 384/4 |
| 5,630,103 | 5/1997 | Smith et al. | 395/500 |

OTHER PUBLICATIONS

Vaughn–Nichols, Steven J., "Data Hunt", Computer Shopper, v. 13, n. 12, p. 652(2), Dec. 1993.

Jain, Raj "A Comparison of Hashing Schemes for Address Lookup in Computer Networks", IEEE Transactions on Communications, v. 40, n. 10, p. 1570–1573, Oct. 1992.

"Special Report: Circuit–Mode Switching", The LocalNetter, v. 13, n. 11, p. 52(1), Nov. 1993.

*Primary Examiner*—Thomas G. Black
*Assistant Examiner*—Charles L. Rones
*Attorney, Agent, or Firm*—Ying Tuo

[57] ABSTRACT

A system for transmitting files includes a transmitting terminal and receiving terminal. After a file transmission has aborted, the receiving terminal generates a size and checksum for the portion of the file received by the receiving terminal. The transmitting terminal generates the checksum based on the corresponding portion of the file stored in the transmitting terminal in reference to the size. The transmitting terminal re-starts the file transmission process if the checksum generated at the receiving terminal does not match that generated at the transmitting terminal. The transmitting terminal transmits the rest of the file that has not received by the receiving terminal if the checksum generated at the receiving terminal matches that generated at the transmitting terminal.

12 Claims, 5 Drawing Sheets

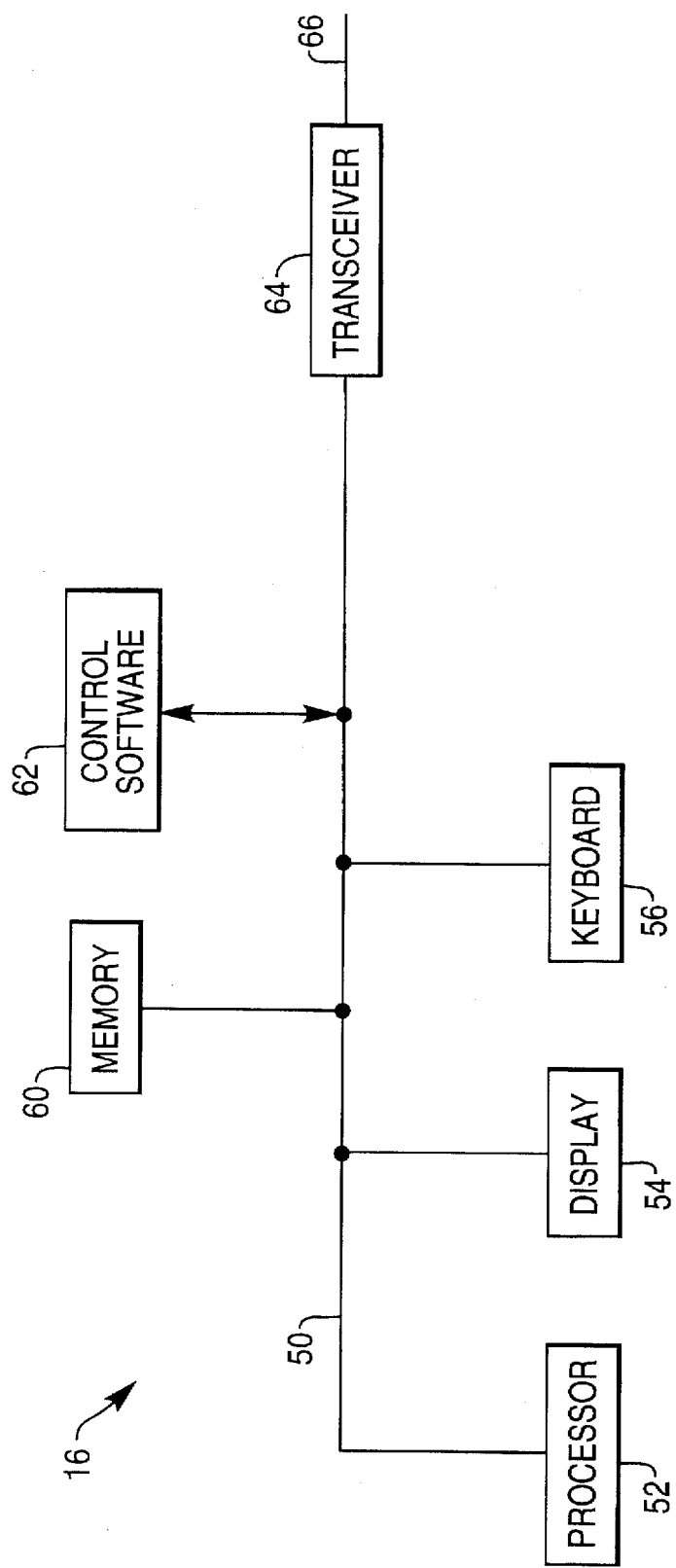

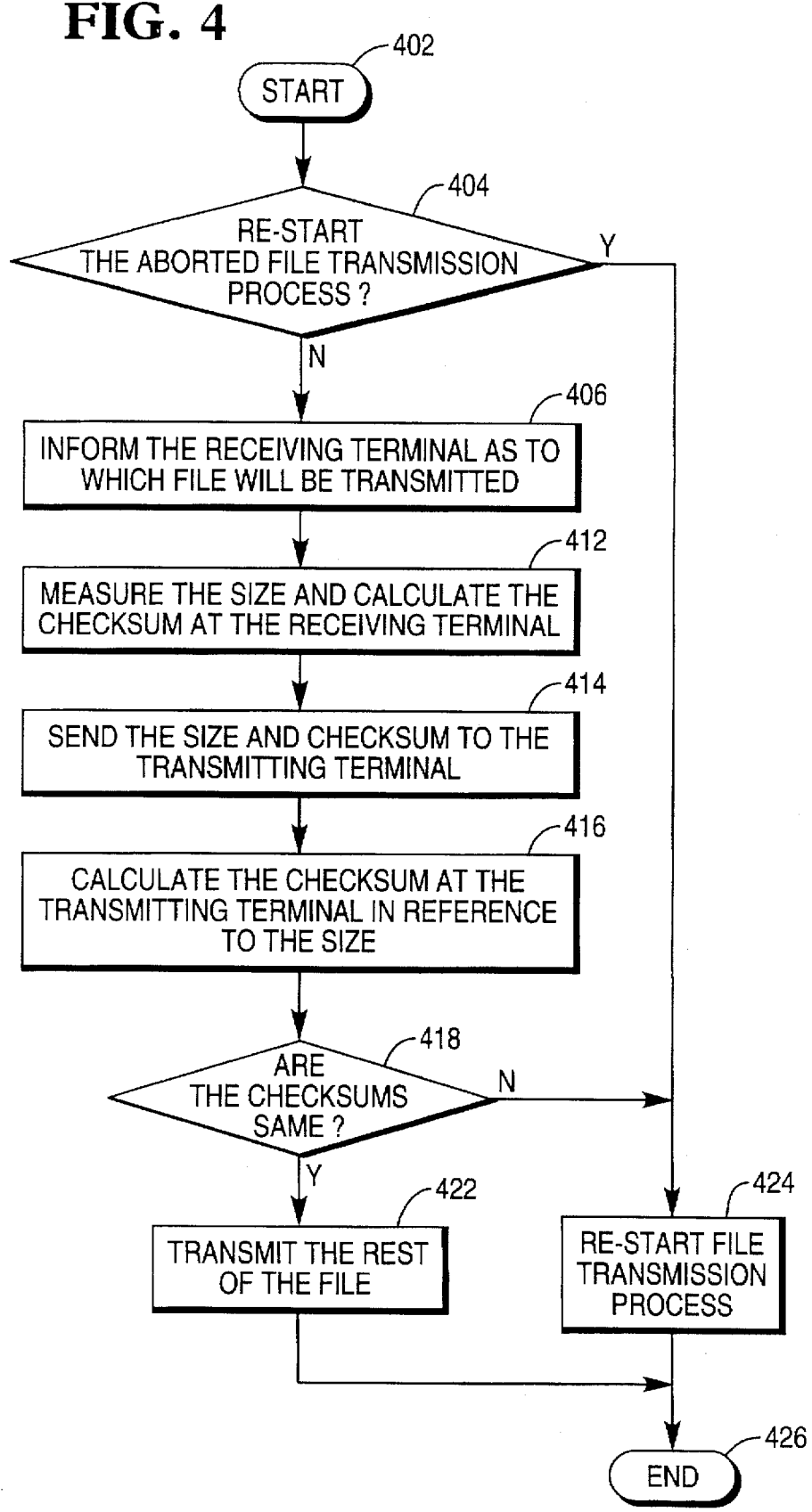

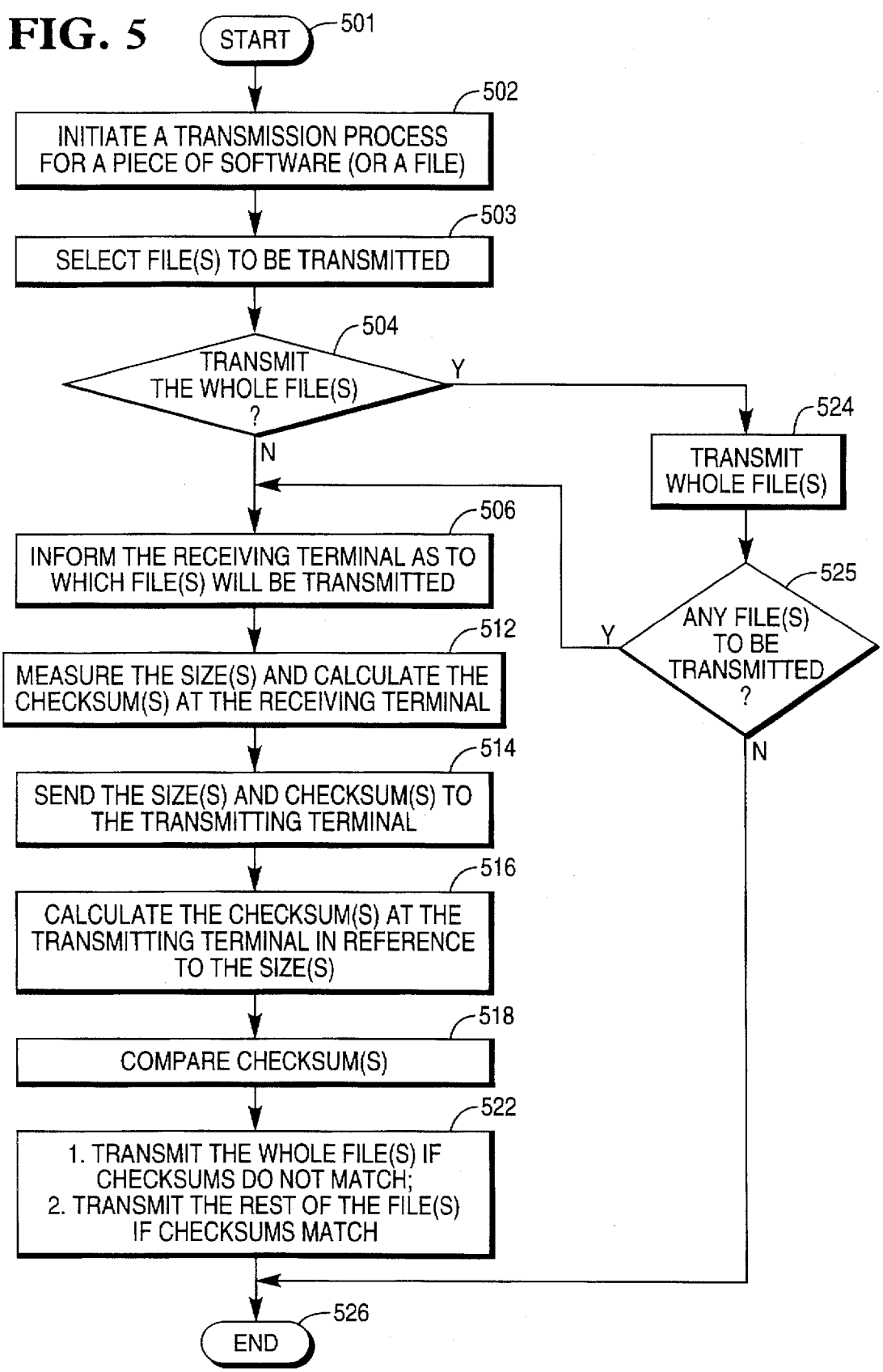

METHOD AND APPARATUS FOR RECOVERING ABORTED FILE (OR DATA) TRANSMISSION

This is a continuation of application Ser. No. 08/512,042 filed on Aug. 7, 1995, and now abandoned.

BACKGROUND OF THE INVENTION

The present invention relates to file (or data) transmission, and particularly, to the recovery process for file (or data) transmission.

In a typical file (or data) transmission process, a transmitting terminal transmits and a receiving terminal receives file(s) via a communication channel. Usually, a file being transmitted is divided into many data blocks. After a portion of the data blocks has been received by the receiving terminal, the transmission process may be aborted for various reasons.

It is possible to recover the aborted file transmission process by transmitting the whole file again. This approach is wasteful of resources, especially when the file contains many data blocks and is transmitted over a long distance communication channel (such as Wide Area Network).

An improved approach has been to generate transmitting status information, while the data blocks are being transmitted from the transmitting terminal to the receiving terminal. During the file transmission process, the receiving terminal periodically acknowledges the data blocks received. According to the acknowledgment, the transmitting terminal keeps a record, reflecting the data blocks that have been successfully received by the receiving terminal. In the process of recovering the aborted file transmission, the transmitting terminal only transmits the data blocks that have not been successfully received by the receiving terminal.

One problem of this approach is that the received data blocks in the receiving terminal may not be consistent with the transmitting status information kept in the transmitting terminal at the time when the recovering process starts. By way of example, some data blocks received can be inadvertently damaged by the operator at the receiving terminal, or the failure (even momentary failure) of the hardware in the receiving terminal may have caused the destruction of some data blocks received.

Another problem of this approach is that the receiving terminal has to periodically acknowledge acceptance of the data blocks, possibly over a long distance communication channel.

Further, in conventional approach, it is difficult for a receiving station to initiate a file transmitting process to only transmit those files that are not in the receiving terminal. For example, in a catastrophic situation at a receiving terminal, some files may have been deleted from the receiving terminal, and the user does not necessary know which ones. In this case, the transmission was not interrupted, but the receiving terminal itself was corrupted.

Accordingly, there has been a need to provide a system and method for transmitting files from a transmitting terminal to a receiving terminal, which provide both efficiency and consistency in recovering file transmission process.

SUMMARY OF THE INVENTION

In one aspect, the present invention provides a system for performing a file transmitting process from a transmitting terminal to a receiving terminal.

The receiving terminal includes:
a processor circuitry for generating a first value for a portion of a file received at the receiving terminal, and for generating a size for the portion of the file received at the received terminal, the portion of the file containing a plurality of data blocks, the first value being calculated based on contents of the portion of the received file; and a transmitting circuitry for sending the first value and size from the receiving terminal to the transmitting terminal.

The transmitting terminal includes:
a processor circuitry for generating a second value for a corresponding portion of a corresponding file stored at the transmitting terminal, the corresponding portion of the corresponding file at the transmitting terminal containing a plurality of data blocks and being indicated by the size from the receiving terminal, the second value being calculated based on contents of the corresponding portion of the corresponding file;

a processor circuitry for comparing the first value generated at the receiving terminal with the second value generated at the transmitting terminal; and a transmitting circuitry for transmitting the corresponding file from the transmitting terminal to the receiving terminal if the first value generated at the receiving terminal does not match the second value generated at the transmitting terminal, and transmitting remaining portion of the corresponding file from the transmitting terminal to the receiving terminal if the first value generated at the receiving terminal matches the second value generated at the transmitting terminal.

In another aspect, the present invention provides a method for performing a file transmitting process from a transmitting terminal to a receiving terminal. The method comprises the steps of:

at the receiving terminal:
generating a first value for a portion of a file received at the receiving terminal, the portion of the file containing a plurality of data blocks, the first value being calculated based on contents of the portion, of the received file;

generating a size for the portion of the file received at the receiving terminal;

sending the first value and size from the receiving terminal to the transmitting terminal;

at the transmitting terminal:
generating a second value for a corresponding portion of a corresponding file stored at the transmitting terminal, the corresponding portion of the corresponding file at the transmitting terminal containing a plurality of data blocks and being indicated by the size from the receiving terminal, the second value being calculated based on contents of the corresponding portion of the corresponding file;

comparing the first value generated at the receiving terminal with the second value generated at the transmitting terminal; and transmitting the corresponding file from the transmitting terminal to the receiving terminal if first value generated at the receiving terminal does not match the second value generated at the transmitting terminal, and transmitting remaining portion of the corresponding file from the transmitting terminal to the receiving terminal if the first value generated at the receiving terminal matches the second value generated at the transmitting terminal.

Accordingly, an object of this invention is to provide a system and method for transmitting files from a transmitting terminal to a receiving terminal, which offer both efficiency and consistency in recovering file transmission process.

BRIEF DESCRIPTION OF THE DRAWING

The principle, features, and advantages of the present invention will become apparent to those skilled in the art to which the invention relates from the subsequent description of the preferred embodiments and the appended claims, in conjunction with the accompanying drawing in which:

FIG. 3 is a simplified block diagram of one of the terminals shown in FIG. 1, in accordance the present invention;

FIG. 4 is a flowchart illustrating the operation of the recovery process after file (or data) transmission has been aborted, in accordance with one embodiment of the present invention; and FIG. 5 is a flowchart illustrating the operation of file transmission, in accordance with another embodiment of the present invention.

DETAILED DESCRIPTION OF THE PREFERRED EMBODIMENTS

Figure 1:
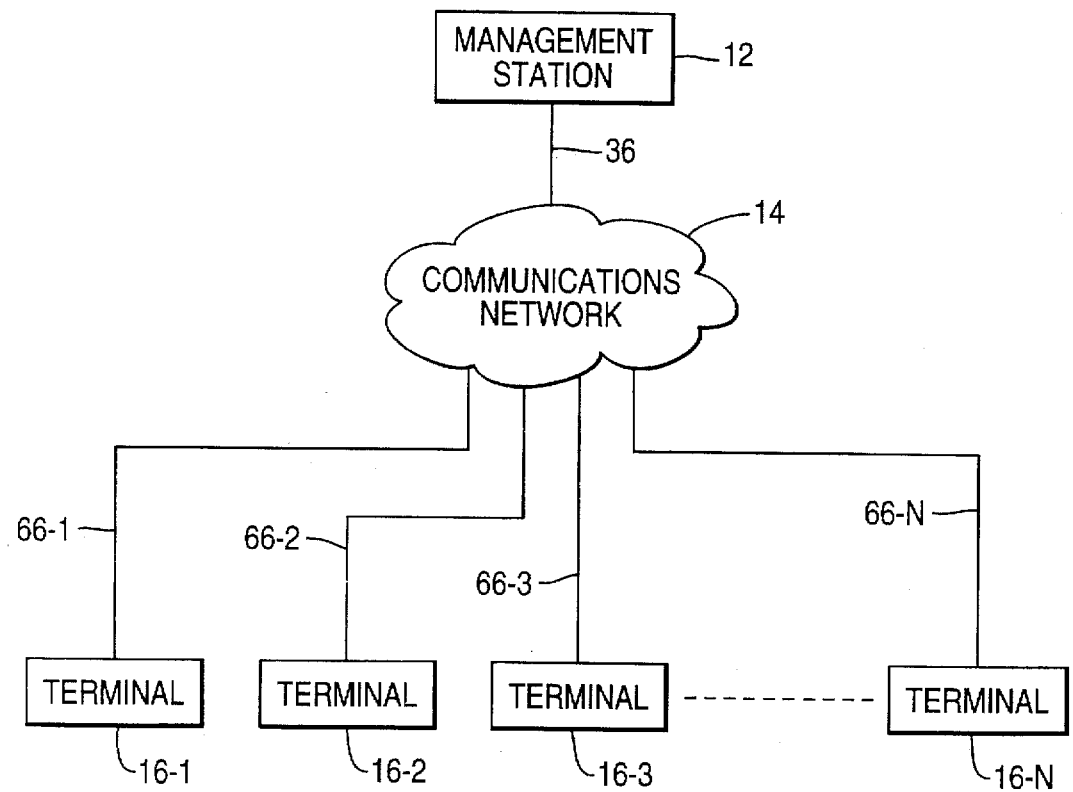
FIG. 1 is a block diagram of a system including a file transmitting terminal (management station) and a plurality of terminals, in accordance with the present invention.

Referring first to FIG. 1, there is shown a terminal system 10 including a file transmitting terminal (management station 12) connected over a communications network 14 to a plurality of file receiving terminals (terminals 16), referenced individually as terminals 16-1, 16-2, 16-3 up to 16-N. In the preferred embodiment, the communications network 14 is a public data network to which the management station 12 and the terminals 16 are connected. The management station 12 may be a computer such as a personal computer (PC) or a workstation.

The management station 12 and terminals 16 can transmit and receive information (including file or data) via the communications network 14 conforming to a predetermined protocol. The number of terminals 16 in the system 10 may be quite large, for example there may be several hundred, or even over one thousand terminals 16 in the system 10. The terminals 16 may be located at widely separated geographical locations.

Figure 2:
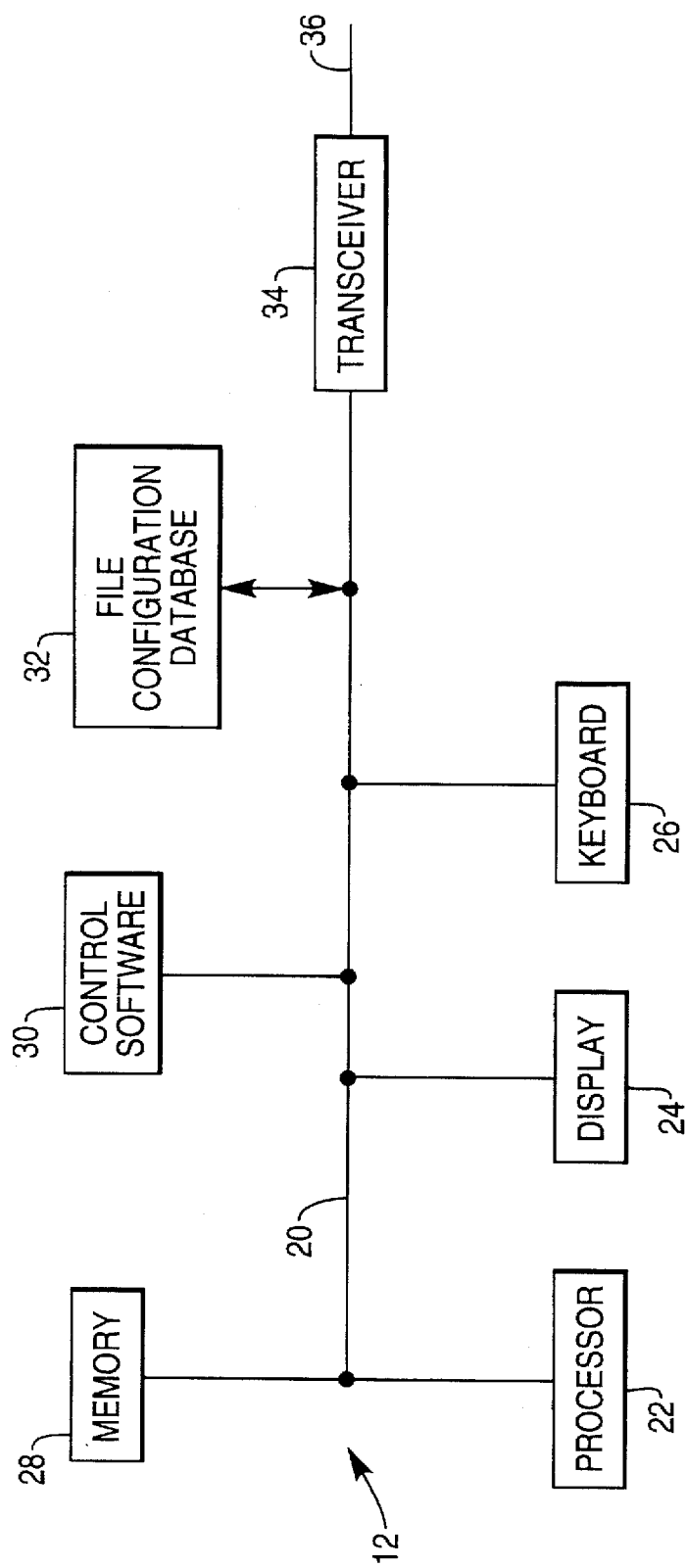
FIG. 2 is a simplified block diagram of the management station shown in FIG. 1, in accordance with the present invention.

Referring now to FIG. 2, there is shown a simplified block diagram of the management station 12. The management station 12 includes a bus 20 to which are connected a processor 22, a display 24, a keyboard 26, and a memory 28. The memory 28 can store the files to be transmitted. Also connected to the bus 20 are a control software storage unit 30 (which may be a part of the memory 28) and a file configuration database 32. The control software storage unit 30 can store the software to carry out the file transmission. The file configuration database 32 stores file configurations for different pieces of software or different versions of a piece of software. These different pieces of software or different versions of a piece of software may have been installed or will possibly be installed in terminals 16. The bus 20 is also connected to a transceiver 34 which communicates with the communications network 14 over a channel 36.

Referring now to FIG. 3, there is shown a simplified block diagram of a terminal 16. The terminal 16 includes a bus 50 to which are connected a processor 52, a display 54, and a keyboard 56. Also connected to the bus 50 are a memory 60, and a control software store unit 62 (which may be part of the memory 60) for storing the software to carry out the file transmission. The memory 60 can store the files (or data blocks) received. The bus 50 is also connected to a transceiver 64 which communicates with the communications network 14 over a channel 66.

Referring now to FIG. 4, there is shown a flowchart illustrating the operation of the recovery process after file (or data) transmission from a transmitting terminal (e.g. the management station 12 in FIG. 1) to a receiving terminal (e.g. a terminal 16 in FIG. 1) has been aborted, in accordance with one embodiment of the present invention.

In step 404, a preliminary decision is made to decide whether to re-start the file transmission that has been aborted, or to transmit the rest of the file that has not been transmitted.

There are three sub-steps in step 404, as follows:
(a) The transmitting terminal makes an inquiry to the receiving terminal via the network, to determine whether the name of the aborted file exists in the receiving terminal. If the file name does not exist in the receiving terminal, the operation leads to step 424 to re-start the file transmission process.
(b) If the file name exists in the receiving terminal, the transmitting terminal further makes an inquiry to the receiving terminal via the network, to determine whether the file size at the receiving terminal is less than 1 block. If the file size is less than 1 block, the operation leads to step 424 to re-start the file transmission process.
(c) If the file size is not less than 1 block, the transmitting terminal further makes an inquiry to the receiving terminal via the network, to determine whether the file size at the receiving terminal is greater than the file size at the transmitting terminal. If the file size at the receiving terminal is greater than the file size at the transmitting terminal (indicating that the data blocks received are not correct), the operation leads to step 424 to re-start the file transmission process. If the file size at the receiving terminal is not greater than the file size at the transmitting terminal, the operation leads to step 406.

In step 406, the transmitting terminal informs the receiving terminal via the network, as to which file will be transmitted.

In step 412, the receiving terminal measures the size of, and calculates the checksum for, the portion of the file received by the receiving terminal. The size of the file can be the number of blocks received. The methods used to calculate the checksum can be CRC-16, CRC-32, and CRC-CCITT, although the principle of the present invention also applies to the other methods. (CRC stands for Cyclic Redundancy Check).

In step 414, the receiving terminal sends the size and checksum of the file to the transmitting terminal via the network.

In step 416, using the same method as in step 412, the transmitting terminal calculates the checksum based on the corresponding portion of the file in the transmitting terminal, in reference to the file size from the receiving terminal.

In step 418, the transmitting terminal compares the checksum calculated at the transmitting terminal with that calculated at the receiving terminal.

If the checksum at the transmitting terminal matches that at the receiving terminal (indicating that no error has occurred in the data blocks received by the receiving terminal), the operation at step 418 leads to step 422 in which the transmitting terminal transmits the rest of the file to the receiving terminal.

If the checksum at the transmitting terminal does not match that at the receiving terminal (indicating that error has occurred in the data blocks received by the receiving terminal), the operation at step 418 leads to step 424.

In step 424, the transmitting terminal re-transmits the whole file.

Referring now to FIG. 5, there is shown a flowchart illustrating the operation of the file (or data) transmission from a transmitting terminal (e.g. the management station 12 in FIG. 1) to a receiving terminal (e.g. a terminal 16 in FIG. 1), in accordance with another embodiment of the present invention.

Step 502 initiates a transmission process for a piece of software The software may contain more than one file. The file configuration for the software is stored in file configuration software database 32 (FIG. 2). This process can be initiated by either the transmitting terminal, or by the receiving terminal by sending a request to the transmitting terminal.

Step 503 selects the file(s) to be transmitted. More than one file can be selected.

In step 503, if the transmission process is initiated by the receiving terminal, the receiving terminal may send the name and version of the software to the transmitting terminal via network 14; if so, the transmitting terminal selects the file(s) to be transmitted based on the information stored in the file configuration database 32 (FIG. 2). Or the receiving terminal may only send the file name(s) to the transmitting terminal; if so, the transmitting terminal selects the file(s) according to the file name(s) sent by the receiving terminal.

In step 504, a decision is made as whether to transmit the whole file(s) selected.

There are three sub-steps in step 504, as follows:
(a) The transmitting terminal makes an inquiry to the receiving terminal via the network, to determine whether any name(s) of the selected file(s) does/do not exist in the receiving terminal.
(b) The transmitting terminal further makes an inquiry to the receiving terminal via the network, to determine whether any file size(s) for selected file(s) at the receiving terminal is/are less than 1 block.
(c) The transmitting terminal further makes an inquiry to the receiving terminal via the network, to determine whether any file size(s) at the receiving terminal is/are greater than the corresponding file size(s) at the transmitting terminal.

In step 504, if any of the inquiries made in steps (a)–(c) is positive (e.g. Yes), the operation leads to step 524.

In step 524, the transmitting terminal transmits the whole of the selected file(s), because either its/their name(s) does/do not exist in the receiving terminal, or its/their file size(s) is/are less 1 block, or its/their file size(s) in the receiving terminal is/are greater than the corresponding file size(s) in the transmitting terminal.

Following step 524, step 525 makes a decision as to whether there is/are any file(s) that needs/need to be transmitted. If there is/are no file(s) needs/need to be transmitted, the operation ends at step 526. If there is/are any file(s) which needs/need to be transmitted, the operation leads to step 506.

In step 504, if all of the inquiries made in steps (a)–(c) are negative (e.g. No), the operation leads to step 506.

It should be noted that the file(s) to be processed by step 506 has/have three characteristics: (1) its/their name(s) exists/exist in the receiving terminal, (2) its/their file size(s) in the receiving terminal is/are greater 1 block, and (3) its/their size(s) in the transmitting terminal is/are less than the corresponding file size(s) in the transmitting terminal.

In step 506, the transmitting terminal informs the receiving terminal via the network, as to which file(s) will be transmitted.

In step 512, the receiving terminal measures the size(s) of, and calculates the checksum(s) for, the portion(s) of the file(s) received by the receiving terminal. The size(s) of the file(s) can be the number of blocks received. The methods used to calculate the checksum(s) can be CRC-16, CRC-32, and CRC-CCITT, although the principle of the present invention also applies to the other methods. (CRC stands for Cyclic Redundancy Check).

In step 514, the receiving terminal sends the size(s) and checksum(s) of the file(s) to the transmitting terminal via the network.

In step 516, using the same method as in step 512, the transmitting terminal calculates the checksum(s) based on the corresponding portion(s) of the file(s) in the transmitting terminal, in reference to the file size(s) from the receiving terminal.

In step 518, for each of the selected file(s) that has/have not been transmitted (e.g. not processed by step 524), the transmitting terminal compares the checksum(s) calculated at the transmitting terminal with that/those calculated at the receiving terminal.

In step 522, the transmitting terminal transmits the whole file(s) if its/their checksum(s) calculated in the receiving terminal does/do not match that/those calculated in the transmitting terminal. In step 522, the transmitting terminal transmits the rest(s) of the file(s) if its/their checksum(s) calculated in the receiving terminal matches/match that/those calculated in the transmitting terminal.

Following step 522, the operation ends at step 526.

It should be understood that the processor 22 (FIG. 2) and 52 (FIG. 3) carry out the steps shown in FIGS. 4 and 5 by executing the control software stored in control software storage units 30 (FIG. 2) and 62 (FIG. 3).

One advantage of the present invention is the safeguard of the data consistency at the transmitting terminal and receiving terminal.

Another advantage of the present invention is that the receiving terminal does not need to periodically acknowledge the receipt of data blocks, and the transmitting terminal does not need to keep a record for the received data blocks based on the acknowledgment.

Still another advantage of the present invention is that it selectively transmits the portion of the file that has not been successfully transmitted.

Further advantage of the present invention is that a user of the system can request re-transmission of all software files, and the invention can selectively transmit those files that are not already there. This is useful in catastrophic situations where some files may have been deleted from the receiving terminal, and the user does not necessarily know which ones. In this case, the transmission was not interrupted, but the receiving terminal itself was corrupted, and the invention provides an easy and efficient means of recovery.

While the particular embodiments of the present invention have been described in detail, it should be understood that the invention may be implemented through alternative embodiments. Thus, the scope of the invention is not intended to be limited to the embodiments described above, but is to be defined by the appended claims.

What is claimed is:

1. A system for performing a file transmitting process from a transmitting terminal to a receiving terminal, comprising:

the receiving terminal including:
- a processor circuitry for generating a first value for a portion of a file received at the receiving terminal, and for generating a size for the portion of the file received at the received terminal, said portion of the file containing a plurality of data blocks, said first value being calculated based on contents of said portion of said received file;
- a transmitting circuitry for sending said first value and size from the receiving terminal to the transmitting terminal;

the transmitting terminal including:
- a processor circuitry for generating a second value for a corresponding portion of a corresponding file stored at the transmitting terminal, said corresponding portion of said corresponding file at the transmitting terminal containing a plurality of data blocks and being indicated by said size from the receiving terminal, said second value being calculated based on contents of said corresponding portion of said corresponding file;
- a processor circuitry for comparing said first value generated at the receiving terminal with said second value generated at the transmitting terminal; and
- a transmitting circuitry for transmitting said corresponding file from the transmitting terminal to the receiving terminal if said first value generated at the receiving terminal does not match said second value generated at the transmitting terminal, and transmitting remaining portion of said corresponding file from the transmitting terminal to the receiving terminal if said first value generated at the receiving terminal matches said second value generated at the transmitting terminal.

2. The system of claim 1,
wherein said first and second values are checksums for the portion received at the receiving terminal and the corresponding portion at the transmitting terminal respectively.

3. An apparatus for performing a file transmitting process from a transmitting terminal to a receiving terminal, comprising:

the transmitting terminal including:
- a receiving circuitry for receiving from the receiving terminal a first value for a portion of a file received at the receiving terminal and for receiving from the receiving terminal a size for the portion of the file received at the received terminal, said portion of the file containing a plurality of data blocks, said first value being calculated based on contents of said portion of received file;
- a processor circuitry for generating a second value for a corresponding portion of a corresponding file stored at the transmitting terminal, said corresponding portion of said corresponding file at the transmitting terminal containing a plurality of data blocks and being indicated by said size from the receiving terminal, said second value being calculated based on contents of said corresponding portion of said corresponding file;
- a processor circuitry for comparing said first value generated at the receiving terminal with said second value generated at the transmitting terminal; and
- a transmitting circuitry for transmitting said corresponding file from the transmitting terminal to the receiving terminal if said first value generated at the receiving terminal does not match said second value generated at the transmitting terminal, and transmitting remaining portion of said corresponding file from the transmitting terminal to the receiving terminal if said first number generated at the receiving terminal matches said second value generated at the transmitting terminal.

4. The apparatus of claim 3, wherein said first and second values are checksums for the portion of the file at the receiving terminal and the corresponding portion of the corresponding file stored at the transmitting terminal respectively.

5. A method for performing a file transmitting process from a transmitting terminal to a receiving terminal, comprising the steps of:
  (a) at the transmitting terminal, receiving, from the receiving terminal, a first value for a portion of a file received at the receiving terminal and a size for the portion of the file received at the receiving terminal, said portion of the file containing a plurality of data blocks, said first value being calculated based on contents of said portion of said received file;
  (b) at the transmitting signal, generating a second value for a corresponding portion of a corresponding file stored at the transmitting terminal, said corresponding portion of said corresponding file at the transmitting terminal containing a plurality of data blocks and being indicated by said size from the receiving terminal, said first value being calculated based on contents of said corresponding portion of said corresponding file;
  (c) at the transmitting signal, comparing said first value generated at the receiving terminal with said second value generated at the transmitting terminal; and
  (d) at the transmitting terminal, transmitting said corresponding file to the receiving terminal if said first value generated at the receiving terminal does not match said second value generated at the transmitting terminal, and transmitting remaining portion of said corresponding file from the transmitting terminal to the receiving terminal if said first value generated at the receiving terminal matches said second value generated at the transmitting terminal.

6. The method of claim 5, wherein said first and second values are checksums for the portion of the file at the receiving terminal and the corresponding portion of the corresponding file stored at the transmitting terminal respectively.

7. A method for performing a file transmitting process from a transmitting terminal to a receiving terminal, comprising the steps of;

at the receiving terminal:
  (a) generating a first value for a portion of a file received at the receiving terminal, said portion of the file containing a plurality of data blocks, said first value being calculated based on contents of said portion of said received file;
  (b) generating a size for the portion of the file received at the receiving terminal;
  (c) sending said first value and size from the receiving terminal to the transmitting terminal;

at the transmitting terminal:
  (d) generating a second value for a corresponding portion of a corresponding file stored at the transmitting terminal, said corresponding portion of said corresponding file at the transmitting terminal containing a plurality of data blocks and being indicated by said size from the receiving terminal, said second value being calculated based on contents of said corresponding portion of said corresponding file;

(e) comparing said first value generated at the receiving terminal with said second value generated at the transmitting terminal; and (f) transmitting said corresponding file from the transmitting terminal to the receiving terminal if first value generated at the receiving terminal does not match said second value generated at the transmitting terminal, and transmitting remaining portion of said corresponding file from the transmitting terminal to the receiving terminal if said first value generated at the receiving terminal matches said second value generated at the transmitting terminal.

8. The method of claim 1, wherein said first and second values are checksums for the portion received at the receiving terminal and the corresponding portion stored at the transmitting terminal respectively.

9. A system for performing a file transmitting process from a source terminal to a destination terminal, comprising:

a processor circuitry, located at the source terminal, for selecting at least one file from a plurality of files at the source terminal;

a processor circuitry, located at the destination terminal, for generating a first value for a respective file corresponding to said selected file at the destination terminal and a size for said respective file, said respective file containing a plurality of data blocks, said first value being calculated based on contents of said respective file;

a transmitting circuitry, located at the destination terminal, for sending said first value and size to the source terminal;

a processor circuitry, located at the source terminal, for generating a second value for a corresponding portion of said selected file stored at the source terminal, said corresponding portion being indicated by said size, said second value being calculated based on contents of said corresponding portion of said selected file;

a processor circuitry, located at the source terminal, for comparing said first value generated at said destination terminal with said second value generated at said source terminal; and a transmitting circuitry, located at the source terminal, for transmitting said selected file from the source terminal to the destination terminal, in response to a comparing result by said comparing circuitry;

wherein said transmitting circuitry at the source terminal transmits a remaining portion of said selected file that is not present in the destination terminal if said second value generated from said selected file at the source terminal matches said first value generated from the respective file at the destination terminal;

wherein said transmitting circuitry at the source terminal transmits said selected file if said second value generated from selected file at the source terminal does not match said first value generated for said respective file at the destination terminal.

10. The system of claim 9, wherein said first and second values are checksums for the respective file stored at the destination terminal and the corresponding portion stored at the source terminal respectively.

11. A method for performing a file transmitting process from a source terminal to a destination terminal, comprising the steps of:

(a) at the source terminal, selecting at least one file from a plurality of files to be transmitted to the destination terminal;

(b) at the destination terminal, generating a first value for a respective file corresponding to said selected file and a size for said respective file, said respective file containing a plurality of data blocks, said first value being calculated based on contents of said respective file;

(c) at the destination terminal, transmitting said first value generated at the destination terminal and size to the source terminal;

(d) at the source terminal, generating a second value for a portion of said selected file stored at the source terminal, said portion being indicated by said size, said second value being calculated based on contents of said portion of said selected file;

(e) at the source terminal, comparing said first value generated from said respective file at the destination terminal with said second value generated from said selected file at the source terminal; and (f) at the source terminal, transmitting said selected file from the source terminal to the destination terminal;

wherein said step (f) transmits a portion of said selected file that is not present in the destination terminal if said second value generated from said selected file at the source terminal matches said first value generated from the respective file at the destination terminal;

wherein said step (f) transmits said selected file if said second value generated from selected file at the source terminal does not match said first value generated for said respective file at the destination terminal.

12. The method of claim 11, wherein said first and second values are checksums for the respective file at the destination terminal and the corresponding portion stared at the source terminal respectively.

* * * * *